United States Patent Office 3,442,955
Patented May 6, 1969

3,442,955
ALKENYL AND ALKYNYL BIPHENYLYL
SULFIDES
Peter E. Newallis, Morris Plains, and Pasquale Lombardo, Hanover, N.J., assignors to Allied Chemical Corporation, New York, N.Y., a corporation of New York
No Drawing. Filed Feb. 8, 1966, Ser. No. 525,851
Int. Cl. C07c *149/32*
U.S. Cl. 260—609                                                    10 Claims

ABSTRACT OF THE DISCLOSURE

Alkenyl and alkynyl biphenylyl sulfides and certain derivatives thereof wherein the unsaturated groups contain alkyl or halogen substituents. These compounds are prepared by reacting 4-biphenylyl mercaptan with an unsaturated halide, or an alkyl- or halogen-substituted derivative thereof, in the presence of a hydrogen halide acceptor. These compounds are useful as insecticides.

---

This invention relates to the production of novel alkenyl and alkynyl biphenylyl sulfides useful as active pesticidal toxicants.

The novel alkenyl and alkynyl biphenylyl sulfide compounds of the present invention are characterized by the structural formula:

$$\text{C}_6\text{H}_5\text{-C}_6\text{H}_4\text{-S-CH}_2\text{-R}$$

in which R is an unsaturated radical selected from the group consisting of $$-\overset{X_3}{\underset{}{C}}=\overset{X_2}{\underset{}{C}}-X_1$$

and —C≡C—$X_1$ radicals wherein $X_1$, $X_2$ and $X_3$ are members selected from the group consisting of hydrogen, alkyl and halogen.

The preferred compounds of the invention are those wherein $X_1$, $X_2$ and $X_3$ are hydrogen, lower alkyl radicals containing from 1 to 6 carbon atoms and halogen atoms having an atomic weight between about 35 and 80, namely, chlorine and bromine. Illustrative alkyl groups include methyl, ethyl, propyl, butyl, pentyl, hexyl, as well as various isomeric forms thereof.

The alkenyl and alkynyl biphenylyl sulfide compounds of the invention may be prepared by reaction of 4-biphenylyl mercaptan with an unsaturated halide selected from the group consisting of alkenyl halides having the formula $$Y-CH_2-\overset{X_3}{\underset{}{C}}=\overset{X_2}{\underset{}{C}}-X_1$$

and alkynyl halides having the formula $$Y-CH_2-C\equiv C-X_1$$

wherein Y represents a halogen atom such as chlorine or bromine and $X_1$, $X_2$ and $X_3$ have the afore-stated meaning, said reaction being conducted in the presence of a hydrogen halide acceptor. The representative reaction of 4-biphenylyl mercaptan and 3-chloropropene using sodium hydroxide as a hydrogen halide acceptor may be illustrated thusly:

$$\text{C}_6\text{H}_5\text{-C}_6\text{H}_4\text{-SH} + \text{Cl-CH}_2\text{-CH=CH}_2 \xrightarrow{\text{NaOH}}$$

$$\text{C}_6\text{H}_5\text{-C}_6\text{H}_4\text{-S-CH}_2\text{-CH=CH}_2 + \text{NaCl} + \text{H}_2\text{O}$$

The alkenyl and alkynyl biphenylyl sulfide compounds of the invention are generally prepared by adding the alkenyl or alkynyl halide to the 4-biphenylyl mercaptan in the presence of an acid halide acceptor. Molar proportions of about 0.9 to 1.2 moles of alkenyl or alkynyl halide per mole of 4-biphenylyl mercaptan may be conveniently employed, although equimolar proportions of these reactants are preferred. Prior to the addition of the alkenyl or alkynyl halide, it is preferred to completely dissolve the 4-biphenylyl mercaptan reactant in water having dissolved there in the requisite amount of acid halide acceptor. Should any of the 4-biphenylyl mercaptan reactant remain undissolved, removal thereof is normally effected by conventional means, as by filtration, and the resulting filtrate is then contacted with the alkenyl or alkynyl halide liquid reactant. When the reaction is conducted in this manner, an essentially pure alkenyl or alkynyl biphenylyl sulfide product may be obtained.

The reaction may be carried out at any temperature up to the decomposition point of the reactants but is preferably effected at about 0° C. to 50° C. Generally, the reaction is exothermic during the addition of the reactants, and cooling is desirable to retard the reaction. If desired, an inert gas such as nitrogen may also be supplied to the reaction vessel to more readily control the reaction and preclude the obtainment of undesired products. After completion of the reaction, the insoluble by-product salt, e.g., sodium chloride, formed during the reaction, may be solubilized by addition of water or a dilute mineral acid, e.g., 10% hydrochloric or sulfuric acid. The desired alkenyl or alkynyl biphenylyl sulfide product is recovered by filtration subsequent to solubilization of the by-product salt. The resulting alkenyl or alkynyl biphenylyl sulfide may be further purified by recrystallization from any inert organic solvent such as ethanol, n-hexane, benzene and toluene.

Suitable acid halide acceptors for the reaction include alkali metal hydroxides such as sodium hydroxide and potassium hydroxide; alkali metal carbonates such as sodium carbonate or potassium carbonate; trialkyl amines such as triethyl amine and trimethyl amine; pyridine, etc.

If desired, the reaction may also be carried out in the presence of an inert organic solvent for one or both of the reactants. Suitable organic solvents include ketones such as acetone and diethyl ketone; ethers such as dioxane, diethyl ether, diisopropyl ether, and di-n-propyl ether; aromatic hydrocarbons such as benzene, toluene, and xylene; and halogenated hydrocarbons such as methylene chloride, chloroform and carbon tetrachloride.

The following examples are given for the purpose of illustrating the present invention but are not intended to be limiting on the scope thereof. In the examples parts are by weight.

Example 1

10 parts of 4-biphenylyl mercaptan were placed in a reaction vessel provided with a mechanical stirrer and a nitrogen inlet. After the vessel was flushed with nitrogen there was added a solution of 2.2 parts of sodium hydroxide in 300 parts of water. To the reaction mixture there were then added 4.1 parts of 3-chloropropene and the reaction was allowed to proceed with stirring for approximately 17 hours. Although the reaction appeared to be complete within a few minutes, stirring of the reaction mixture at room temperature was continued for a period of approximately 17 hours. The white solid which persisted was filtered and washed twice with water and then with 10% hydrochloric acid. The residue, upon recrystallization from an aqueous ethanol solution, melted at 67–72° C. and comprised 10.5 parts (theory—12 parts) of allyl(4-biphenylyl) sulfide.

*Analysis.*—Calculated for $C_{15}H_{14}S$: C, 79.6%; H, 6.23%; S, 14.2%. Found: C, 78.66%; H, 5.61%; S, 14.31%.

Example 2

11 parts of 4-biphenylyl mercaptan were placed in a reaction vessel provided with a mechanical stirrer. 3 parts of sodium hydroxide dissolved in 300 parts of water were then added to the vessel. After permitting the reaction vessel contents to stir for a period of about 30 minutes, the insoluble matter was filtered off and the resulting solution transferred to a second reaction vessel equipped with a stirrer and a nitrogen inlet. The vessel was flushed with nitrogen and then 6 parts of 2,3-dichloropropene were added thereto. Although a white solid immediately began to form after addition of the 2,3-dichloropropene, stirring of the reaction mixture at room temperature was continued overnight (approximately 17 hours). The solid was filtered, subjected to washing with water, then with 10% hydrochloric acid and finally with water. The yellowish solid residue, upon recrystallization from hexane, melted at 43–46° C. and comprised 8 parts of 2-chloro allyl(4-biphenylyl) sulfide.

*Analysis.*—Calculated for $C_{15}H_{13}ClS$: C, 69.1%; H, 5.03%; Cl, 13.60%; S, 12.30%. Found: C, 68.44%; H, 4.91%; Cl, 13.88%; S, 12.39%.

Example 3

10 parts of 4-biphenylyl mercaptan were reacted with 6.4 parts of propargyl bromide using the procedure described in Example 1. 9 parts of propargyl(4-biphenylyl) sulfide, a light yellow solid, having a melting point of 74–76° C., were obtained.

Example 4

13.8 parts of 4-biphenylyl mercaptan were added to 300 parts of water having dissolved therein 3 parts of sodium hydroxide. The mixture was stirred for a period of about 4 hours while nitrogen was being passed therethrough. The undissolved material was filtered, and 4.53 parts of 1-chlorobutene-2 were added to the filtrate. Although a precipitate was formed immediately, stirring of the reaction mixture at room temperature was continued overnight (approximately 17 hours). The solid was collected by filtration, washed twice with water, then with 10% hydrochloric acid and again with water. 9 parts of crotyl(4-biphenylyl) sulfide, a white solid having a melting point of 75–76° C., were obtained.

*Analysis.*—Calculated for $C_{16}H_{16}S$: S, 13.35%. Found: S, 13.35%.

Example 5

The procedure of Example 4 was repeated except that 7.3 parts of 1,2,3-trichloropropene were used as the alkenyl halide reactant. 9.5 parts of 2,3-dichloroallyl(4-biphenylyl) sulfide, a light yellow solid having a melting point of 82–84° C., were obtained.

*Analysis.*—Calculated for $C_{15}H_{12}Cl_2S$: Cl, 24.00%; S, 10.8%. Found: Cl, 22.9%; S, 11.1%.

Example 6

The procedure of Example 4 was repeated except that 4.53 parts of 2-chloromethylpropene were used as the alkenyl halide reactant. 10.5 parts of methallyl(4-biphenylyl) sulfide, a white solid having a melting point of 59–60° C., were obtained.

*Analysis.*—Calculated for $C_{16}H_{16}S$: S, 13.35%. Found: S, 13.35%.

Example 7

2.8 parts of 1,3-dichloropropene were reacted with 6.9 parts of 4-biphenylyl mercaptan using the procedure described in Example 4. 6 parts of 3-chloroallyl(4-biphenylyl) sulfide, a solid having a melting point of 53–54° C., were obtained.

*Analysis.*—Calculated for $C_{15}H_{13}ClS$: S, 13.6%. Found: S, 13.3%.

Other compounds illustrative of the present invention which may be prepared in a manner analogous to that described in the above examples are as follows:

3,3-diethylallyl(4-biphenylyl) sulfide
3-isopropylallyl(4-biphenylyl) sulfide
3-bromoallyl(4-biphenylyl) sulfide
2,3,3-trichloroallyl(4-biphenylyl) sulfide
3-chloromethallyl(4-biphenylyl) sulfide
3-bromocrotyl(4-biphenylyl) sulfide
3-n-butylallyl(4-biphenylyl) sulfide
2-chloro-3-n-butylallyl(4-biphenylyl) sulfide
2-ethyl-3-chloroallyl(4-biphenylyl) sulfide
3-methylpropargyl(4-biphenylyl) sulfide
3-chloropropargyl(4-biphenylyl) sulfide
3-bromopropargyl(4-biphenylyl) sulfide
3-isopropylpropargyl(4-biphenylyl) sulfide
3-ethylpropargyl(4-biphenylyl) sulfide The novel alkenyl and alkynyl biphenylyl sulfides of the instant invention have a high degree of biocidal activity in a number of important fields, and are particularly effective as insecticides.

In the insecticidal field, control of many noxious pests can be effected by contacting the pests or their environment, their food or their host, such as insect infested plants, soils, etc., with the alkenyl or alkynyl biphenylyl sulfide compounds of the invention. The insects controlled thereby may be in adult, nymph, larval or egg form.

Although the compounds of the present invention are useful per se in combatting a wide variety of insect pests, it is preferred that the compounds be supplied to the pests or to the environment of the pest or pests in conjunction with a major proportion of a carrier which may be a solid, liquid or gaseous material, the invention compounds constituting the toxic ingredient of such compositions. The toxicant compounds may be employed either in the form of aqueous sprays or dust compositions and the amount of toxicant used in combatting the insect pests may vary considerably provided a sufficient quantity is used to provide the desired toxicity.

When employed in the form of a powder or dust for killing pests, the toxicant compounds may be mixed with a substantial portion of any suitable inert material or diluent, preferably in finely divided form, such as known grades of prepared carrier clays, pyrophyllite, fuller's earth, bentonite, sulfur, lime, talc, whiting, diatomaceous earth, etc. Suitable dusts of this type usually contain not less than 1% and preferably not less than 5% by weight of toxicant.

Liquid pesticide sprays containing the toxicants of this invention may be prepared by first forming a solution of the compound in a suitable organic solvent, e.g. xylene, methylated naphthalenes, acetone, hexane, dioxane, methyl ethyl ketone, solvent naphtha or any highly aromatic petroleum-type oil, and preferably adding a small amount of emulsifying agent commonly employed in the art such as diglycol oleate, p-iso-octyl phenyl ether of polyethylene glycol, sodium decylbenzene sulfonate and sodium dodecylbenzene sulfonate. The resulting concentrate solution, usually containing about 2 to 8 pounds of the toxicant per gallon of organic solvent, is incorporated with water in quantity sufficient to form an aqueous dispersion or emulsion having the desired active ingredient concentration.

In a preferred embodiment, aqueous spray dispersions or emulsions may be formed by incorporating in water dry mixtures or so-called wettable spray powders containing the toxicants of the invention, generally in an amount of about 15 to 85 weight percent, based on the weight of the powder. These mixtures may also include inert diluents, suitable quantities of wetting and dispersing agents and, if desired, secondary toxicants.

The aqueous spray dispersions of the invention preferably should contain the active ingredient in an amount not less than 4 ounces per 100 gallons of spray, the more usual concentration being in the range of 1 to 2 pounds per 100 gallons of spray.

Representative compounds of the invention were tested for insecticidal activity against Mexican bean beetles by preparing solutions of the compounds in acetone (4.8 grams of compound in 100 milliliters of acetone) and adjusting them by dilution with water to suspensions having the concentrations indicated in Table I below. The suspensions were then sprayed onto leaves of horticultural (cranberry) bean plants, 2 seconds on the upper surface and 5 seconds on the under surface. After spraying, the deposits were allowed to dry on the plants and the pests being tested were confined in cages on the treated leaves. The plants were observed three days after treatment and the results of the test were recorded. These results are set forth in Table I below:

TABLE I

| Toxicant compound | Pounds per 100 gallons | Mexican bean beetle larvae (percent kill) |
|---|---|---|
| Allyl(4-biphenylyl) sulfide | 2 | 100 |
| Do | 1 | 80 |
| 2-chloroallyl(4-biphenylyl) sulfide | 2 | 100 |
| Do | 1 | 100 |
| Propargyl(4-biphenylyl) sulfide | 2 | 70 |
| Crotyl(4-biphenylyl) sulfide | 2 | 65 |
| 2,3-dichloroallyl(4-biphenylyl) sulfide | 2 | 100 |
| Methallyl(4-biphenylyl) sulfide | 2 | 70 |
| 3-chloroallyl(4-biphenylyl) sulfide | 2 | 105 |

Since various changes and modifications may be made in the invention without departing from the spirit thereof, it is intended that all matter contained in the above description shall be interpreted as illustrative and not in a limiting sense.

We claim:

1. A biphenylyl sulfide compound having the structural formula

—S—CH$_2$—R in which R is an unsaturated radical selected from the group consisting of

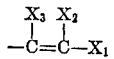

and —C≡C—X$_1$ radicals wherein X$_1$, X$_2$ and X$_3$ are members selected from the group consisting of hydrogen, alkyl of 1-6 carbon atoms, chlorine and bromine.

2. The compound in accordance with claim 1 wherein R is the radical

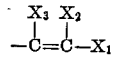

3. The compound in accordance with claim 1 wherein R is the radical —C≡C—X$_1$.
4. Allyl(4-biphenylyl)sulfide.
5. 2-chloroallyl(4-biphenylyl)sulfide.
6. Methallyl(4-biphenylyl)sulfide.
7. 2,3-dichloroallyl(4-biphenylyl)sulfide.
8. Crotyl(4-biphenylyl)sulfide.
9. 3-chloroallyl(4-biphenylyl)sulfide.
10. Propargyl(4-biphenylyl)sulfide.

References Cited

UNITED STATES PATENTS

| 3,246,039 | 4/1966 | Reifschneider | 260—609 |
| 3,268,592 | 8/1966 | Sterling | 260—609 |

OTHER REFERENCES

Lester: "J. Amer. Chem. Soc.," vol. 66, pp. 1674–1675 (1944).

CHARLES B. PARKER, *Primary Examiner.*

D. R. PHILLIPS, *Assistant Examiner.*

U.S. Cl. X.R.

424—337